United States Patent
McNulty

(10) Patent No.: US 8,661,676 B2
(45) Date of Patent: Mar. 4, 2014

(54) ROTARY DIE FORMING PROCESS AND APPARATUS FOR FABRICATING MULTI-PORT TUBES

(76) Inventor: Frank G. McNulty, Rochester Hills, MI (US)

(*) Notice: Subject to any disclaimer, the term of this patent is extended or adjusted under 35 U.S.C. 154(b) by 93 days.

(21) Appl. No.: 13/400,167

(22) Filed: Feb. 20, 2012

(65) Prior Publication Data

US 2012/0247600 A1 Oct. 4, 2012

Related U.S. Application Data

(60) Provisional application No. 61/468,851, filed on Mar. 29, 2011, provisional application No. 61/492,536, filed on Jun. 2, 2011, provisional application No. 61/509,670, filed on Jul. 20, 2011.

(51) Int. Cl.
| | |
|---|---|
| *B21D 31/00* | (2006.01) |
| *B21D 53/02* | (2006.01) |
| *B21D 53/04* | (2006.01) |
| *B21K 21/00* | (2006.01) |

(52) U.S. Cl.
USPC ............... 29/890.049; 165/177; 72/379.2

(58) Field of Classification Search
USPC ......... 29/890.053, 890.03, 890.032, 890.045, 29/890.049; 165/177, 179, 183, 152; 73/379.2, 379.4, 379.6, 367.1, 370.16, 73/370.17, 370.19
See application file for complete search history.

(56) References Cited

U.S. PATENT DOCUMENTS

| | | | |
|---|---|---|---|
| 5,185,925 A | 2/1993 | Ryan et al. | |
| 5,186,250 A * | 2/1993 | Ouchi et al. | 165/177 |
| 5,441,106 A | 8/1995 | Yukitake | |
| 5,586,598 A * | 12/1996 | Tanaka et al. | 165/133 |
| 5,765,634 A * | 6/1998 | Martins | 165/177 |
| 6,138,354 A | 10/2000 | Kobayashi et al. | |
| 6,688,382 B2 * | 2/2004 | Hargreaves | 165/177 |
| 7,657,986 B2 | 2/2010 | Anders et al. | |
| 7,823,630 B2 * | 11/2010 | Itoh et al. | 165/177 |
| 8,091,621 B2 * | 1/2012 | Zobel et al. | 165/177 |
| 8,353,335 B2 * | 1/2013 | Ploppa et al. | 165/177 |
| 2004/0007040 A1 | 1/2004 | Ibron et al. | |
| 2005/0092476 A1 | 5/2005 | Hu et al. | |
| 2009/0025916 A1 * | 1/2009 | Meshenky et al. | 165/151 |

FOREIGN PATENT DOCUMENTS

| | | |
|---|---|---|
| WO | 94/00726 A1 | 1/1994 |
| WO | 2007/084984 A2 | 7/2007 |

* cited by examiner

*Primary Examiner* — David Bryant
*Assistant Examiner* — Jun Yoo
(74) *Attorney, Agent, or Firm* — Gifford, Krass, Sprinkle, Anderson & Citkowski, P.C.

(57) ABSTRACT

Multi-port tube structures are fabricated in a process in which a web of metallic material has a pattern of features formed therein by a rotary die forming process carried out on a continuous basis. The web of material is cut into strips which are folded so as to define a closed tubular structure having internal features defining longitudinal fluid flow channels.

12 Claims, 5 Drawing Sheets

ROTARY DIE FORMING PROCESS AND APPARATUS FOR FABRICATING MULTI-PORT TUBES

CROSS-REFERENCE TO RELATED APPLICATIONS

This application claims priority of U.S. Provisional Patent Applications Nos. 61/468,851 filed Mar. 29, 2011; 61/492,536 filed Jun. 2, 2011; and 61/509,670 filed Jul. 20, 2011, the contents of which are all incorporated herein by reference.

FIELD OF THE INVENTION

This invention relates to processes and apparatus for forming articles from sheets of a metallic material. More specifically the invention relates to methods and apparatus for forming multi-port tubes through the use of a rotary die forming apparatus.

BACKGROUND OF THE INVENTION

Multi-port tubes comprise elongated, generally flattened, tubular members having a plurality of at least partially separated fluid flow channels extending along their length. Such tubes are incorporated into radiators, condensers, and other heat exchange structures of the type employed in motor vehicles; heating, ventilation, and air conditioning systems; nuclear power plants; chemical processing facilities; and the like. In a typical application, a relatively large number of these multi-port tubes are stacked into an array and disposed so as to convey a liquid or gaseous heat exchange fluid through the multi-port interior. In most applications, the individual multi-port tubes are relatively small in cross section and have lengths ranging from several inches to several feet. Operational parameters of the heat exchange structures generally require that the multi-port tubes be capable of providing for the relatively unimpeded flow of fluid therethrough under high pressure conditions without leakage or bursting. In addition, the multi-port tubes must be of uniform and precise geometry so as to facilitate their assembly into precise arrays. Furthermore, given the very large number of such tubes incorporated into a typical heat exchanger application, it is also important that such tubes be relatively low in cost.

In many instances, extrusion processes have been employed in the prior art for the fabrication of multi-port tubes of this type. In an extrusion process, a molten metallic material is extruded under high pressure through a die to form the tubular structure. While extrusion processes are capable of providing elongated, seamless multi-port tubes, extrusion equipment is relatively expensive and costly to implement and control. Additionally, the fact that the extrusion process requires the use of molten metals limits the range of materials which may be practically utilized for the fabrication of the multi-port tubes; and, additives must be incorporated into the metal, either pre or post-heating, to insure that strength and corrosion resistance criteria are met.

In other approaches, conventional metal shaping techniques such as bending, roll forming, and the like are employed to fabricate the multi-port tubes. In a typical process of this type, a corrugated interior member of the tube is first formed by bending or the like and is subsequently wrapped or otherwise disposed within an exterior member which is then brazed or welded shut to form a closed tube encasing the corrugated insert which serves to define the multi-port interior. Systems for carrying out processes of this type are relatively complicated and expensive and occupy a large area of floor space. In addition, fabrication and handing of a separate insert portion complicates the assembly process and can compromise the integrity of the finished product. Published PCT application WO 2007/084984 of Zobel shows a multi-roller apparatus as configured to fabricate a flattened multi-port tube incorporating a separate corrugated insert.

In some instances, the prior art has looked to processes for the fabrication of multi-port heat exchanger tubes which do not require the use of a separate corrugated insert. U.S. Patent Application Publication 2005/0092476 shows a process in which a multi-port tube is fabricated from a single body of stamped sheet metal by a method in which separate halves of each port are defined in a series of stamping dies and subsequently folded into alignment and brazed together. This process requires precise alignment of the segments of the tube and relies upon formation of a large number of brazed joints to assure the integrity of the resultant structure. U.S. Pat. No. 5,441,106 discloses a roll forming process for the fabrication of multi-port heat exchanger tubes from a single piece of folded metallic material. As taught therein, the folded structure relies upon a brazed joint to maintain the tube in a closed structure. The tubing is formed in a multi-stage roll forming process which, in addition to being expensive and occupying a large amount of floor space, precludes the incorporation of mechanical locking features into the tube structure thereby conditioning the integrity of the tube solely upon the brazed joint. A similar roll forming process is shown in U.S. Pat. No. 7,657,986 wherein a series of roll forming dies progressively fold and shape a sheet of metallic material into a multi-port tubular structure.

Prior art extrusion and roll forming processes of the type discussed above all employ complicated, expensive, and large area apparatus. In addition, multi-port tube structures fabricated by methods of the prior art typically require extensive post-fabrication processing to assure that the thus produced tube structures meet the precise geometric requirements for the heat exchangers into which they will be fabricated. Such post-forming processing can contaminate the structures with metal shavings and the like further requiring additional cleaning steps. Also, processes such as extrusion and roll forming cannot easily add interior structures such as locking features, fluid flow control features, and the like to the multi-port tubes. In addition to all the foregoing, processes of the prior art are relatively slow. As will be explained hereinbelow, the present invention is directed to a high speed, relatively simple, compact and low cost rotary die forming system for fabricating multi-port tube structures.

Parts fabricated by the method of the present invention can incorporate internal locking and fluid control features. In addition, the parts are fabricated to precise geometric tolerances and do not require significant post fabrication processing. These and other advantages of the present invention will be apparent from the drawings, discussion, and description which follow.

SUMMARY OF THE INVENTION

Disclosed is a method for fabricating a multi-port tube from an elongated web of a metallic stock material. The web of material is advanced through a rotary die forming station which is configured and operative so as to form a pattern of features in the web. The pattern of features includes a first and second group of features. Each group comprises a plurality of grooves and ridges extending along at least a portion of the length dimension of the web in a direction generally parallel to the direction of travel of the web through the rotary die forming station. The first and second groups of features are spaced apart from one another along the width dimension of the web which is transverse to the direction of travel of the web through the rotary die forming station. The web, having the pattern of features defined thereupon, is cut along its width so as to provide a strip. Subsequently, opposed edges of the strip are folded inward toward the center of the strip so as to form a tubular structure in which the grooves and ridges of the first and second groups of features define a plurality of fluid channels within the tubular structure. The pattern of features may further include turbulence enhancing structures such as knurls, holes, slots, knobs, and textured surfaces associated with the thus defined channels.

In some instances, the first and second groups of features may include one or more locking members defined therein which, when the strip is folded, cooperate to retain opposed edges of the strip in engagement with one another thereby enhancing the integrity of the tube. The metallic material may comprise one or more of a ferrous alloy, aluminum, copper, and brass; and in some instances, the metallic material may include a coating which in some instances may be a brazing alloy, a flux, a solder, a solder paste, or another metal such as aluminum. In particular instances, the step of folding is implemented in a two-stage process wherein in a first step a first edge portion of the strip including the first group of features is folded inward onto a first segment of the strip which does not have any features defined thereupon, and a second edge portion of the strip is folded onto a second segment of the strip not having any features defined thereupon. In a second stage of the folding process, the first and second segments having their respective first and second edge portions folded thereonto are further folded toward the center of the strip so as to define the tubular structure.

Further disclosed is an apparatus for carrying out the process.

DETAILED DESCRIPTION OF THE INVENTION

The present invention will be described with regard to some specific embodiments; however, it is to be understood that in view of the teaching presented herein, one of skill in the art may readily implement other variations and embodiments all of which are within the scope of this invention.

Figure 1:
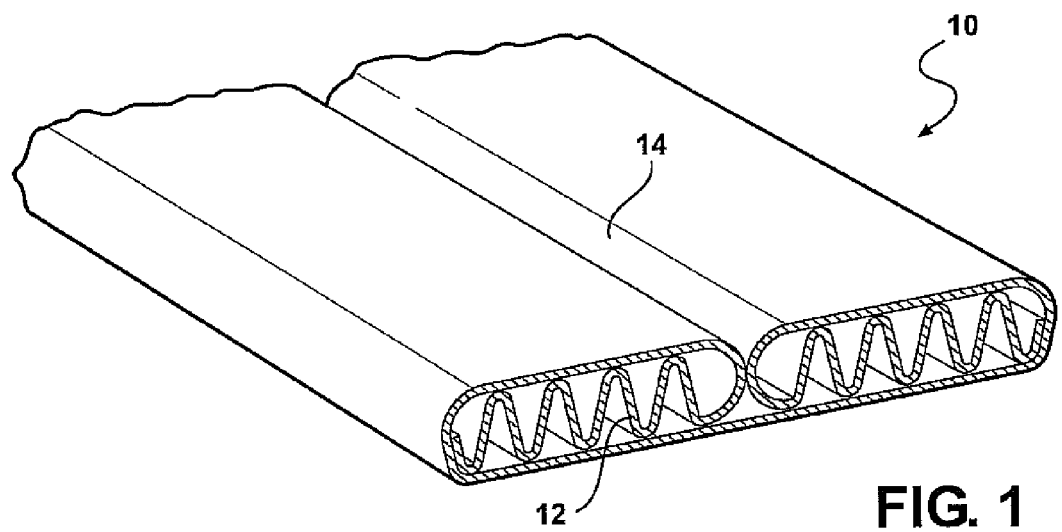
FIG. 1 is a perspective view of a portion of a multi-port tube fabricated in accord with the present invention.

Referring now to FIG. 1, there is shown a section of a portion of a multi-port tube 10 fabricated in accord with the present invention. This tube 10 is formed from a single folded strip of a metallic material such as a sheet of ferrous alloy, aluminum, copper, brass, or the like. The sheet is folded on itself to form a flattened tubular structure having a plurality of integral, internal corrugations, for example corrugation 12, extending along the length thereof. As will be explained hereinbelow, the strip is folded such that portions thereof abut to form a central seam 14 which may be sealed by solder, a brazing alloy, a weld, an adhesive, or the like. As will be explained with regard to other embodiments, the central seam 14 may also be closed, at least in part, by a mechanical interlocking feature. In fabricating a typical heat exchanger, a plurality of tubes of the type shown in FIG. 1 are assembled into an array and connected to a source of a heat exchange fluid so as to form a heat exchange structure such as a radiator, heater, or the like.

It is a notable feature of the present invention that the forming process for preparing shaped strips which are folded into a tubular structure, such as the structure 10 of FIG. 1, is implemented utilizing a rotary die forming process wherein the web of metallic material is advanced between a pair of rotating cylindrical dies having corresponding patterns of features defined thereupon. These dies contact the web of material and operate to emboss a pattern of features onto the substrate material. These features may include grooves, corrugations, knobs, dimples, textures, and other surface deformations. In addition, the features may include piercings such as holes, slots, and the like. U.S. Pat. No. 5,794,502 is illustrative of a typical rotary die forming process of the prior art. While rotary die forming has been implemented in the prior art for cutting, piercing, or otherwise shaping relatively thin bodies of stock material, the prior art has not recognized that use of a rotary die forming process in the fabrication of multi-port tubes secures very particular and significant advantages insofar as such processes, in addition to having high throughput, low cost, and modest space requirements, allow for the single stage fabrication of features including piercings, locking features, turbidity enhancing features, and the like directly into multi-port tube structures.

Figure 2:
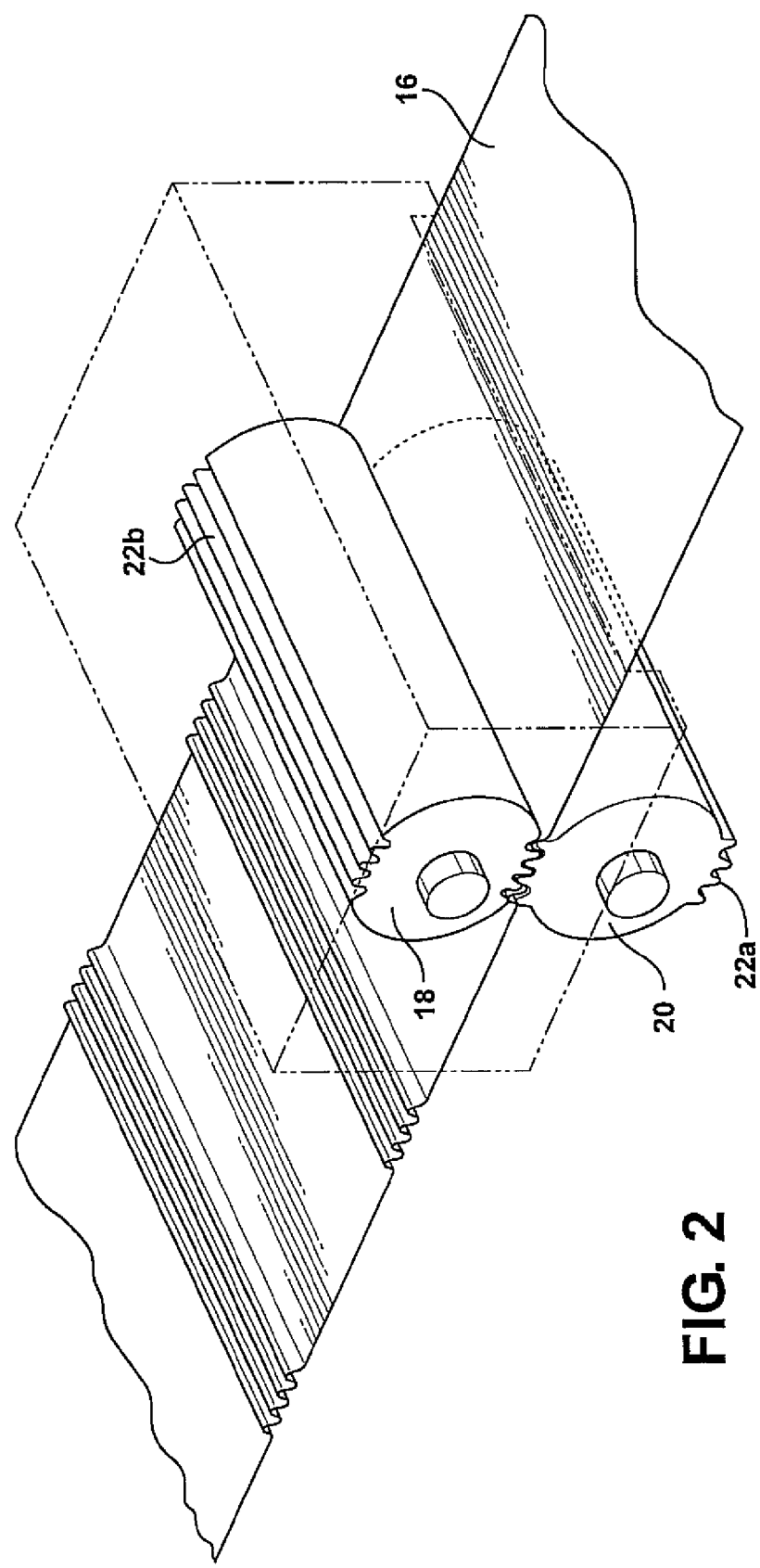
FIG. 2 is a depiction of the die portion of a rotary die forming apparatus as being operative to shape a web of substrate material in accord with the present invention.

Specifically shown in FIG. 2 is a portion of a web of stock material 16 being advanced through a pair of rotary die rollers 18, 20. As shown in FIG. 2, the rollers 18, 20 have corresponding patterns of die features such as features 22a, 22b defined on their surfaces and such features cooperate to define a corresponding pattern into the web of material 16. As shown in FIG. 2, the features 22a, 22b extend along the length dimension of the dies 18, 20, so that the pattern of ridges and grooves formed in the web 16, extend along the width dimension of the web 16. As a result of this orientation of the pattern, the width dimension of the web 16, will determine the length dimension of the finished multi-port tube. As will be described with reference to other embodiments of the invention, the pattern of ridges and grooves may extend across the length of the web, in which instance, the corresponding patterns in the dies 18, 20 will run along the circumference of the dies 18,20. It is to be understood that the dies may be configured to form other patterns or features, such as locking structures, projections, openings, textures and the like onto the web 16 as will be described below.

Figure 3:
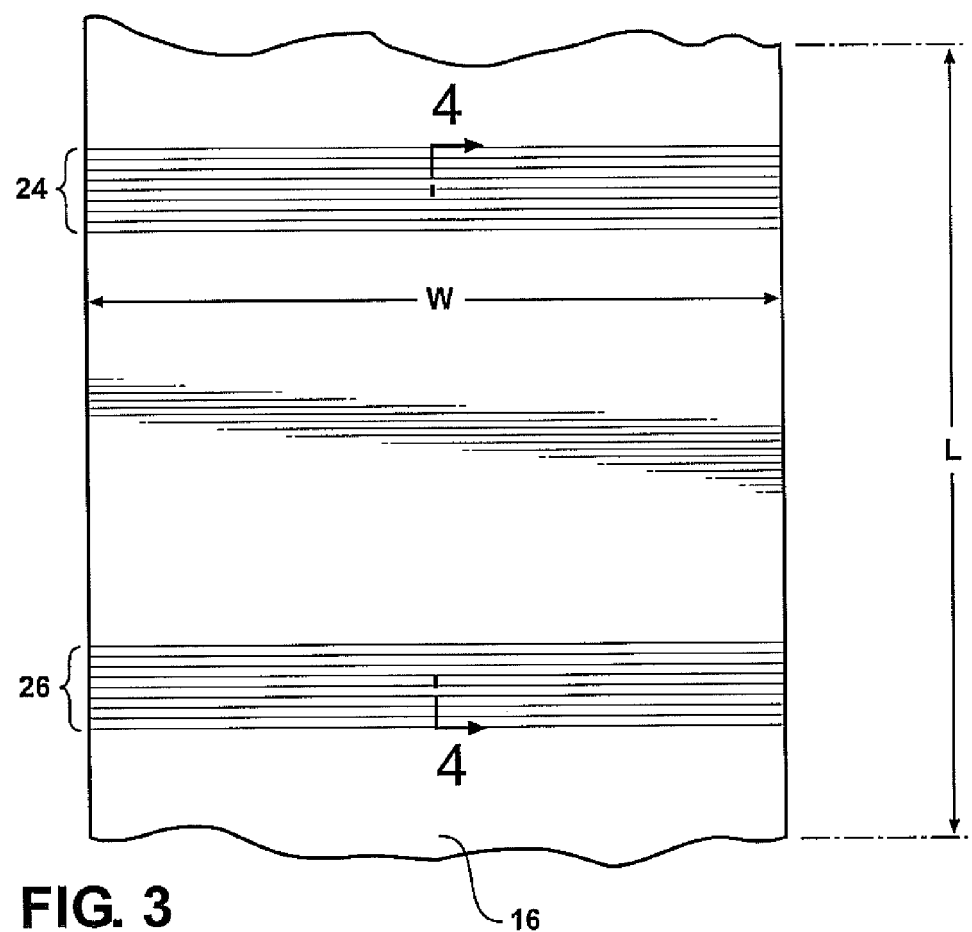
FIG. 3 is a top plan view of a sheet of a metallic substrate material which has passed through a rotary die forming station so as to have a pattern of features formed thereupon.

Referring now to FIG. 3, there is shown a top plan view of a portion of a web of material 16 having had a pattern of features formed thereupon by a rotary die forming process in accord with the present invention, using dies generally similar to those in FIG. 2. The pattern of features on the web includes a first group of features 24 defined thereupon and a second group of features 26 defined thereupon. These two groups of features 24, 26 each comprise at least a plurality of ridges and grooves which extend along at least a portion of the width dimension (W) of the web, which width dimension is transverse to the direction of travel of the web through the rotary die forming station. The first 24 and second 26 groups of features are spaced from one another along the length dimension (L) of the web which is parallel to the direction of travel of the web through the rotary die forming station. The first 24 and second 26 patterns of features may be identical or they may differ. Also, it is to be noted that in addition to including a plurality of grooves and ridges, the pattern of features may also include other features such as protrusions, knobs, slots, holes, and the like as will be explained in detail hereinbelow.

As specifically shown in FIG. 3, the first 24 and second 26 groups of features extend along the width of the web 16 and and are spaced apart along its length so as to form gap portions which are free of features. These gap portions define non-featured parts of the multi-port tube, and also can facilitate cutting of the web into workpieces.

Figure 4:
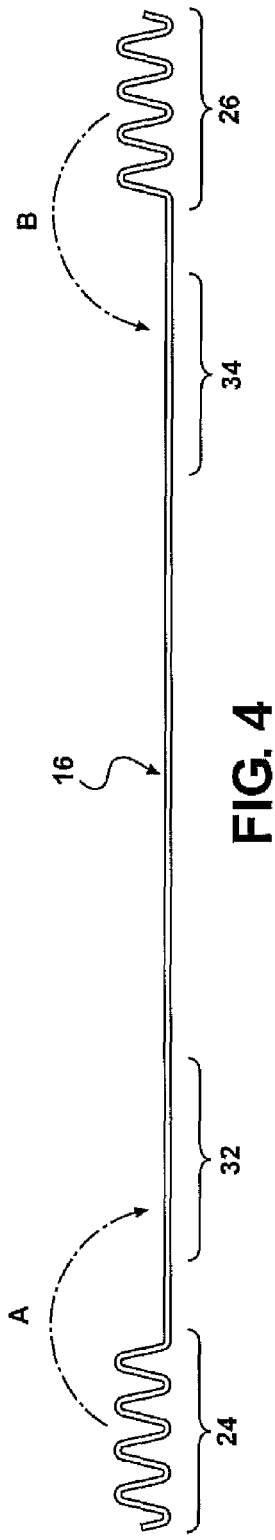
FIG. 4 is a cross-sectional view of the web of substrate material of FIG. 3 taken along line 4-4.

Referring now to FIG. 4, there is shown a cross-sectional view of the web of material 16 taken along line 4-4. As discussed above, the web of material 16 includes a first group of features 24 and a second group of features 26 each of which comprises a plurality of grooves and ridges. In accord with the present invention, the web of substrate material 16 is cut into a number of pieces, each of which will subsequently be folded so as to form a multi-port tube structure. In accord with a specific embodiment, the web of substrate material 16 of FIG. 3 is cut into strips each of which has a length measured parallel to the ridges and grooves of the first and second groups of features, which length will correspond to the length of the finished tube.

The folding process in this embodiment will be described with reference to FIGS. 4-6. As shown in FIG. 4, a first edge of the strip having the first pattern 24 defined thereupon is folded inward toward the center line of the web in the direction of arrow A so as to overlie a first, central segment of the strip 32 not having any features defined thereupon. Likewise, a second edge of the strip having the second pattern 26 defined thereupon is folded inward in the direction of arrow B so as to overlie a second central portion of the strip 34 not having any features defined thereupon.

Figure 5:
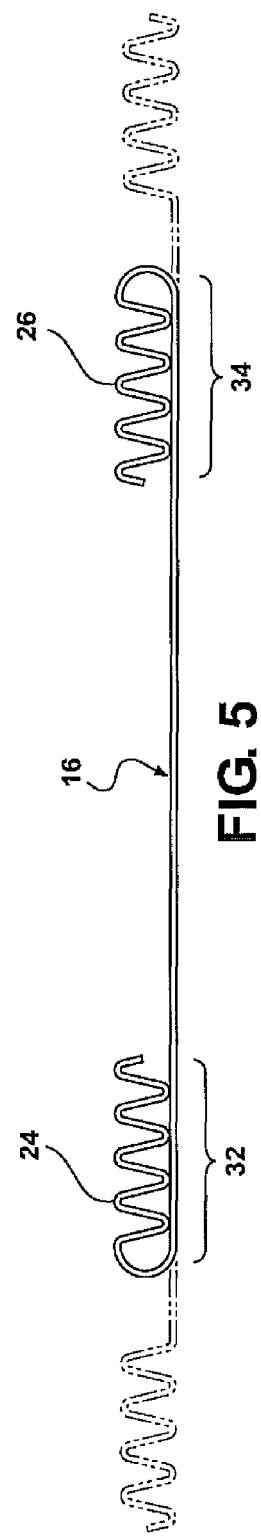
FIG. 5 shows the strip of material of FIG. 4 at a first stage in a folding process.
Figure 6:
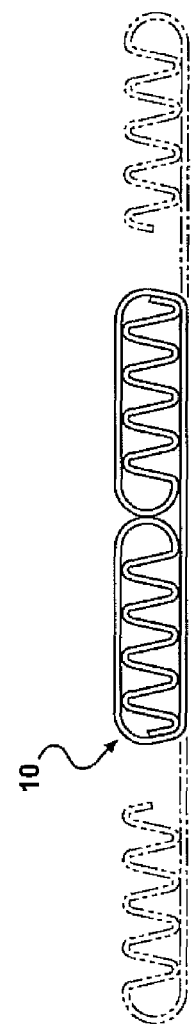
FIG. 6 shows the strip of FIG. 4 at a second stage in the folding process.

FIG. 5 shows the strip of web material 16 following the first folding step, and it will be seen that the first group of features 24 overlies the first segment 32 and the second group of features 26 overlies the second segment 34. In a subsequent step, the first segment 24 and the second segment 26 are again folded inward toward the center of the strip of material 16 in the direction of arrows C and D respectively so as to define the closed tubular structure 10 as shown in FIG. 6.

Figure 7:
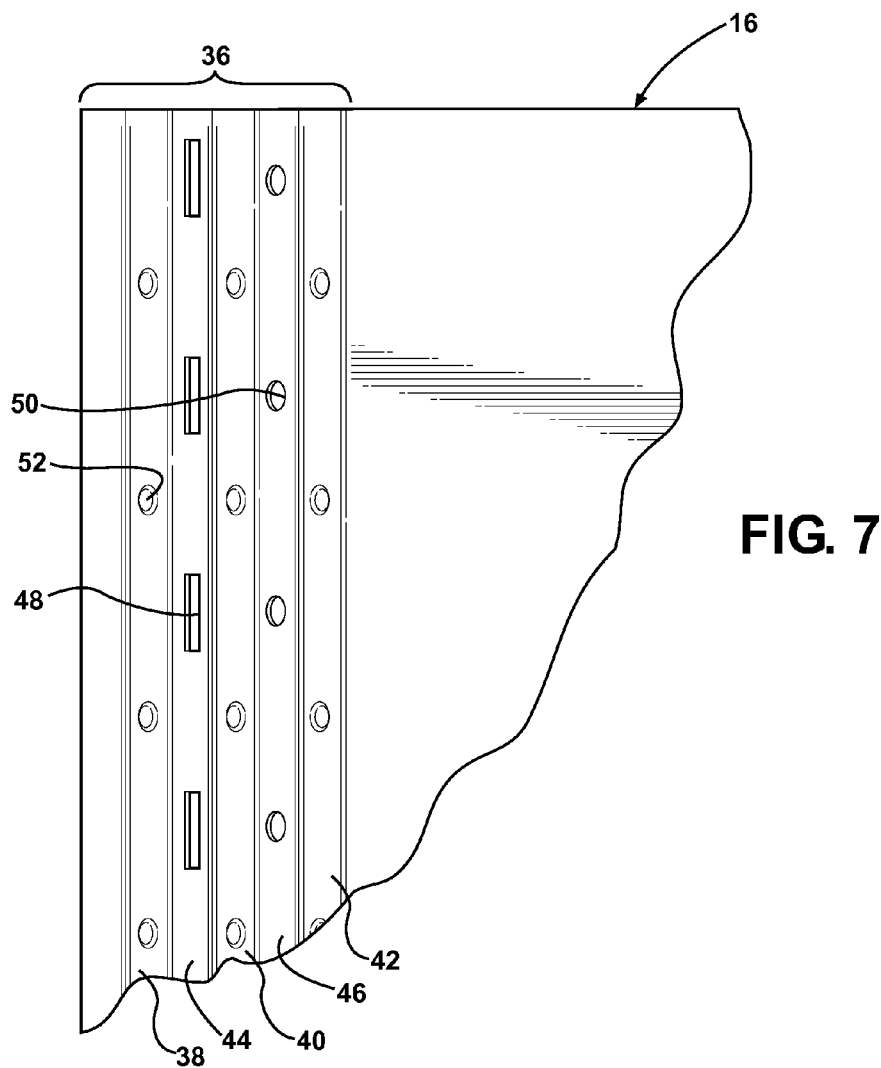
FIG. 7 is a top plan view of a portion of a web of substrate material having features formed thereupon in accord with the present invention.

As mentioned above, the use of the rotary die forming process of the present invention allows for the incorporation of further features into the tubular structures. Referring now to FIG. 7, there is shown a portion of a web of material 16 having a pattern of features 36 formed thereupon in a rotary die forming process. These features include ridges 38, 40, 42 and grooves 44, 46 as previously described. Further in accord with the present invention, other features may be incorporated into the pattern. For example, one or more slits 48 or holes 50 may be formed in any or all of the ridges or grooves, and these openings will serve to permit some cross flow of fluid between channels of the to be formed multi-port tube. Other turbulence enhancing features such as knobs or dimples 52 may likewise be formed in the ridges and/or grooves. As further shown in FIG. 7, locking features such as tabs 54 may be included in the patterns of features and will function, when the tube structure is complete, to facilitate locking of the seam.

Figure 8:
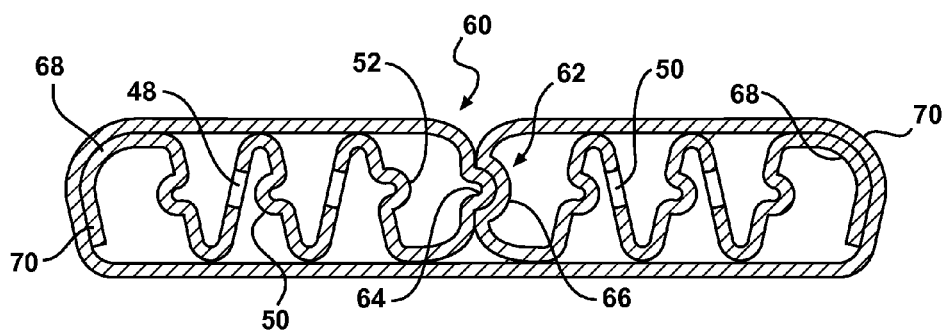
FIG. 8 is a cross-sectional view of another embodiment of multi-port tube fabricated in accord with the present invention.

Referring now to FIG. 8, there is shown a cross-sectional view of another embodiment of multi-port tube 60 in accord with the present invention. As will be seen from the figure, the tube includes a locking feature 62 which in this embodiment is defined by a tab portion 64 associated with a first pattern of features which is disposed so as to engage and cooperate with a notch portion 66 associated with a second group of features so as to lock the tube structure into a closed position. This locking feature may be utilized as a replacement for, or in combination with, sealing methods such as brazing, soldering, adhesives, or welding. Other locking features such as tab and slot arrangements may likewise be incorporated. The illustration of FIG. 8 shows a number of turbulence enhancing knobs or dimples 52 associated with the interior structure of the tube 60. Likewise, FIG. 8 shows a number of slots 48 or holes 50. All of these features serve to enhance turbulence in the flow of fluid through the multi-port structure thereby increasing the rate of heat exchange. These features are optional and may be used singly or in combination or in some instances may be dispensed with.

FIG. 8 illustrates yet another feature of the present invention. As will be seen therefrom, end portions 68 of the interior structure of the tube are disposed so as to be coextensive with exterior portions 70 of the tube 60. This provides for a double wall thickness at the edge portions of the tube 60 thereby enhancing its strength and reliability. Again, this feature is optional but may be readily implemented through the use of the rotary die forming process of the present invention.

As described with particular reference to FIGS. 3-6, the invention may be implemented in a mode in which the pattern of features is defined in the web so as to extend parallel to the width dimension of the web; and in this instance, the length of the finished tube will be determined by the width dimension of the web. The advantage of operating in this mode is that following folding, no further finishing steps need be implemented with regard to the ends of the tubes. However, the invention may also be implemented in a mode wherein the grooves defining the pattern of features are formed parallel to the length dimension of the web of material; and in such instance, the length of the finished tube will correspond to the length of the strip which is folded. Advantages of so implementing the invention reside in the fact that the strip need not be cut with regard to its width dimension, which will be determined by the width of the web of material. This provides clean, finished edges which facilitate the inward folding of the structure thereby avoiding prefolding processing steps.

Figure 9:
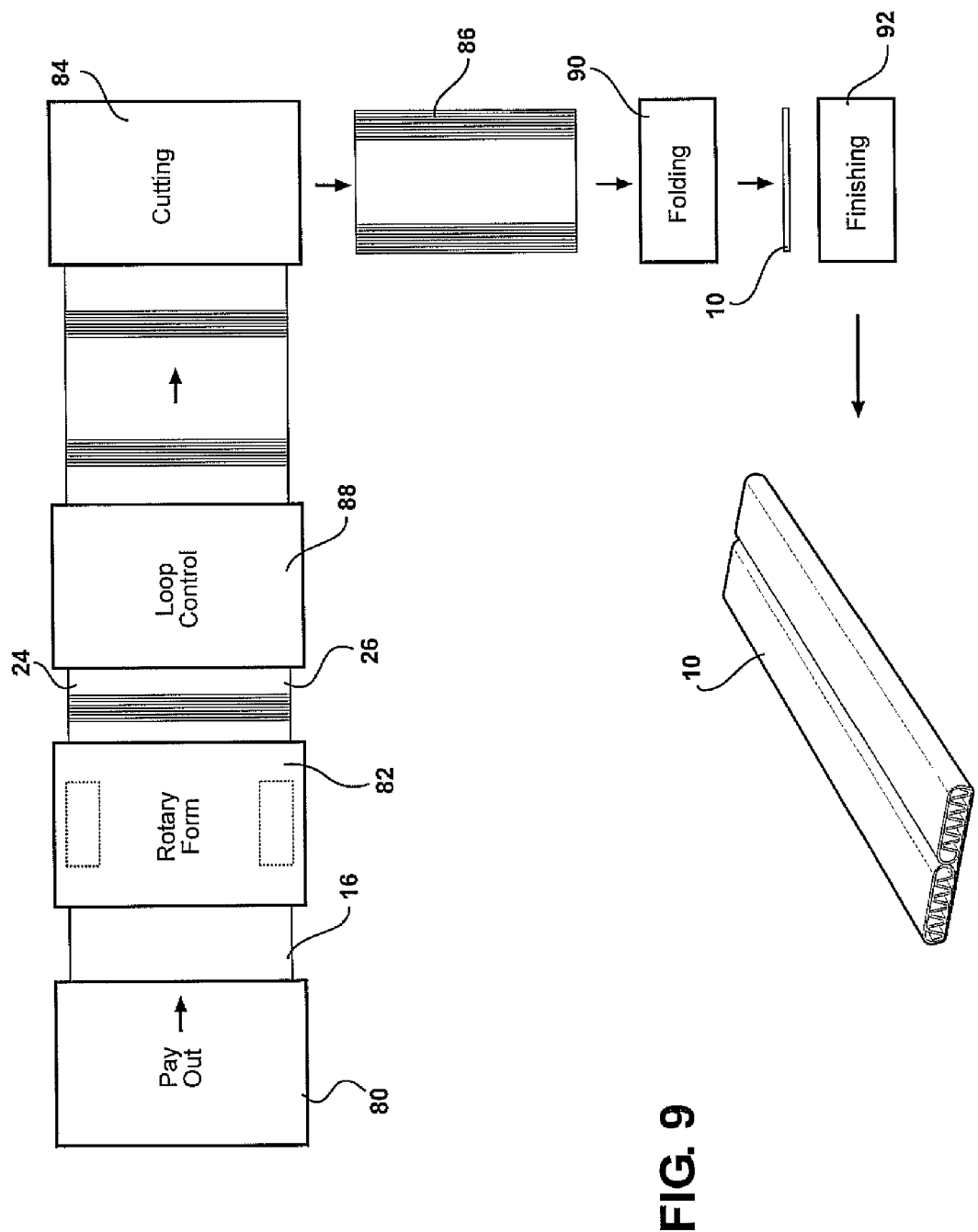
FIG. 9 is a schematic depiction of a process in accord with the present invention.

The present invention may be implemented in a number of specific embodiments, and FIG. 9 is a schematic depiction of one particular implementation of the invention. In the embodiment of FIG. 9, a web of substrate material 16 is fed out of a payout station 80. In a typical implementation, the substrate material 16 is retained in a rolled form and dispensed from the payout station to a rotary forming station which, as previously described, forms a first 24 and second 26 pattern of features thereupon. As shown in FIG. 3, these patterns of features 24, 26 extend along the width dimension of the web 16 although, as mentioned above, they may likewise extend parallel to the length dimension of the web 16. The system of FIG. 9 includes a cutting station 84 which receives the web of material 16 and cuts it into strips, such as strip 86, for further processing. In the implementation of FIG. 9, the web of substrate material 16 is continuously fed to the rotary forming station; however, it is preferable that the travel of the web be halted while cutting is being implemented.

Therefore, the system of FIG. 9 further includes a loop control station 88 therein. The loop control station 88 gathers the moving substrate being fed from the rotary forming station 82 and allows it to form a loop thereby temporarily halting downstream travel of the web to the cutting station 84. Following implementation of cutting, the substrate again advances from the loop control station.

Following cutting, the strips 86 are folded as described with reference to FIGS. 4-6 in a folding station 90. Such folding may be accomplished by the use of roll forming technology, bending technology, or the like as is known in the art. The folding process shapes the strip 86 into a multi-port tube 10. The thus formed tube 10 may be optionally conveyed to a finishing station 90 wherein operations such as brazing, welding, adhesive joining, cleaning and the like may be implemented.

Numerous modifications and variations of the system of FIG. 9 will be readily apparent to those of skill in the art. For example, prior to entering the rotary forming station 82, preforming operations such as edge conditioning, trimming, piercing, slitting, or the like may be carried out. The FIG. 9 embodiment shows only one folding station 90 in communication with the cutting station 84; however, given the fact that the rotary forming and cutting steps may be implemented at very high rates of speed, in particular embodiments a number of folding stations may be disposed in parallel so as to receive high volume output from a cutting station 84.

Also, the system of the present invention may be readily expanded in size to meet increased production demands. For example, a number of rotary forming stations may be disposed in parallel so as to receive multiple webs of substrate material which are then cut and conveyed to a large bank of folding stations for further processing. In view of the teaching presented herein, all of such modifications and variations will be readily apparent to those of skill in the art.

The foregoing drawings, discussion, and description are illustrative of some particular embodiments of the present invention but are not meant to be a limitation upon the practice thereof. It is the following claims, including all equivalents, which define the scope of the invention.

The invention claimed is:

1. A method for fabricating a multi-port tube, said method comprising the steps of:
    providing an elongated web of a metallic stock material;
    providing a rotary die forming station;
    advancing said web of stock material through said rotary die forming station wherein said station is configured and operative so as to form a pattern of features in said web, said pattern of features comprising a first and a second group of features, each group comprising a plurality of ridges and grooves extending along at least a portion of a width dimension of said web, said width dimension being transverse to the direction of travel of said web through said rotary die forming station;
    said first and second groups of features being spaced from one another along a length dimension of said web, said length dimension being parallel to the direction of travel of said web through said rotary die forming station;
    cutting said web having said pattern of features defined thereupon, along its width dimension so as to provide a strip having a pair of opposed, cut edges corresponding to said width dimension of said web; and thereafter
    folding said opposed cut edges of said strip inward, toward the center of said strip, so as form a tubular structure wherein said grooves and ridges define a plurality of fluid channels within said tubular structure.

2. The method of claim 1, wherein at least one of said first and second groups of features further includes a turbulence enhancing member.

3. The method of claim 2, wherein said turbulence enhancing member is selected from the group consisting of knurls, holes, slots, knobs, textured surfaces, and combinations thereof.

4. The method of claim 1, wherein at least one of said first group and said second group of features includes a locking member operative to retain said opposed edges of said strip in engagement with one another when said step of folding is implemented.

5. The method of claim 4, wherein said first group of features includes a first part of a two-part locking member and said second group of features includes a second part of said two-part locking member.

6. The method of claim 1, wherein said step of folding comprises a two-stage folding process wherein in a first step, a first edge portion of said strip including said first group of features is folded inward onto a first segment of said strip, said first segment not having any of said first or second groups of features defined thereupon, and wherein a second edge portion of said strip including said second group of features is folded inward onto a second segment of said strip not having any of said first or second group of features defined thereupon;
    and a second stage wherein the first and second segments having their respective first and second edge portions folded thereonto are folded inward so as to define said tubular structure.

7. The method of claim 1, wherein said metallic material is selected from the group consisting of ferrous alloys, aluminum, copper, brass, and combinations thereof.

8. The method of claim 1, wherein said web of stock material includes a coating thereupon.

9. The method of claim 8, wherein said coating is selected from the group consisting of brazing alloys, fluxes, solder, solder paste, aluminum, and combinations thereof.

10. The method of claim 1, wherein said step of folding said opposed edges is implemented utilizing a roll forming process.

11. The method of claim 1, wherein said web of stock material is continuously advanced through said rotary die forming station.

12. A multi-port tube formed by the process of claim 1.

* * * * *